(12) United States Patent
Chrisikos et al.

(10) Patent No.: US 10,506,592 B2
(45) Date of Patent: Dec. 10, 2019

(54) METHOD, SYSTEM AND/OR DEVICE FOR MANAGING COMMUNICATION CHANNELS

(71) Applicant: QUALCOMM Incorporated, San Diego, CA (US)

(72) Inventors: George Chrisikos, San Diego, CA (US); Ramaswamy Venkateshwaran, Dublin, CA (US); Ashok Bhatia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/479,171

(22) Filed: Apr. 4, 2017

(65) Prior Publication Data

US 2018/0288765 A1   Oct. 4, 2018

(51) Int. Cl.

| | | |
|---|---|---|
| *H04W 72/04* | (2009.01) | |
| *H04W 36/14* | (2009.01) | |
| *H04B 7/185* | (2006.01) | |
| *H04W 72/08* | (2009.01) | |
| *H04W 4/90* | (2018.01) | |
| *H04W 76/15* | (2018.01) | |
| *H04B 1/10* | (2006.01) | |
| *H04W 72/12* | (2009.01) | |
| *H04W 84/12* | (2009.01) | |
| *H04W 84/04* | (2009.01) | |
| *H04W 88/06* | (2009.01) | |

(52) U.S. Cl.
CPC ........ *H04W 72/0453* (2013.01); *H04B 1/109* (2013.01); *H04B 7/1851* (2013.01); *H04W 4/90* (2018.02); *H04W 36/14* (2013.01); *H04W 72/085* (2013.01); *H04W 72/1215* (2013.01); *H04W 76/15* (2018.02); *H04W 72/082* (2013.01); *H04W 84/042* (2013.01); *H04W 84/12* (2013.01); *H04W 88/06* (2013.01)

(58) Field of Classification Search
CPC . H04W 72/0453; H04W 76/025; H04W 4/22; H04W 72/085; H04W 36/14; H04W 84/042; H04W 84/12; H04B 7/1851
See application file for complete search history.

(56) References Cited

U.S. PATENT DOCUMENTS

| | | |
|---|---|---|
| 9,307,505 B2 | 4/2016 | Zhu et al. |
| 2009/0318087 A1 | 12/2009 | Mattila et al. |
| 2013/0065533 A1 | 3/2013 | Cai et al. |
| 2013/0207839 A1 | 8/2013 | Simic et al. |
| 2014/0226502 A1 | 8/2014 | Behnamfar et al. |

(Continued)

OTHER PUBLICATIONS

International Search Report and Written Opinion—PCT/US2018/023195—ISA/EPO—dated Jul. 5, 2018.

*Primary Examiner* — Ajit Patel
*Assistant Examiner* — Richard Schnell
(74) *Attorney, Agent, or Firm* — Hunter Clark PLLC

(57) ABSTRACT

Disclosed are methods, systems and devices for addressing effects of transmission by a transmitter in an assigned uplink communication channel on a signal received at a receiver co-located with the transmitter. In a particular embodiment, communication in an alternative communication channel may be initiated in response to a determination that uplink transmission in the assigned communication channel likely interferes with at least one radio frequency receiving function.

10 Claims, 8 Drawing Sheets

(56) References Cited

U.S. PATENT DOCUMENTS

| | | | |
|---|---|---|---|
| 2015/0117228 A1* | 4/2015 | Daub | H04W 72/082 |
| | | | 370/252 |
| 2015/0140954 A1* | 5/2015 | Maier | H04W 4/22 |
| | | | 455/404.2 |
| 2015/0215947 A1* | 7/2015 | Kaukovuori | H04W 72/0453 |
| | | | 370/329 |
| 2015/0350953 A1* | 12/2015 | Himayat | H04W 40/02 |
| | | | 370/235 |
| 2016/0234748 A1 | 8/2016 | Chrisikos et al. | |
| 2016/0242071 A1 | 8/2016 | Chen et al. | |
| 2016/0285505 A1 | 9/2016 | Lee et al. | |
| 2016/0309379 A1* | 10/2016 | Pelletier | H04W 76/022 |
| 2017/0064727 A1 | 3/2017 | Chrisikos | |
| 2017/0201997 A1* | 7/2017 | Cheng | H04W 72/082 |

\* cited by examiner

METHOD, SYSTEM AND/OR DEVICE FOR MANAGING COMMUNICATION CHANNELS

BACKGROUND

Field

Embodiments described herein are directed to wireless communications, and more particularly to enhancement of throughput in multi-carrier systems with satellite positioning system (SPS) concurrency.

Information

While a radio access technology (RAT) transceiver is transmitting data wirelessly via an antenna, a satellite positioning system (SPS) receiver located on the same device may or may not be able to process received SPS signals for performing a location determination operation. While transmitting, a RAT transceiver may, in some situations, produce a sufficient amount of noise and/or interference that negatively affects the ability of the SPS receiver to properly receive and process SPS signals. As such, performance of the collocated SPS receiver may be degraded during the time that the RAT transceiver is transmitting. To mitigate this degradation, the RATs may be instructed to alter their transmissions, or the SPS receiver may be instructed to blank or otherwise ignore SPS signals received while the RAT transceiver is transmitting. Such arrangements may result in significant periods of time during which a location determination cannot be performed by the SPS receiver or is severely compromised. Such an occurrence may be exacerbated if multiple RAT transceivers are present on the device.

SUMMARY

Briefly, one particular implementation is directed to a method, at a mobile device, comprising: identifying a first communication channel; and selecting a second communication channel from among a plurality of candidate communication channels for establishing or maintaining a communication connection based, at least in part, on an assessment of an impact of distortion on at least one radio frequency receiving function from a combination of transmission on the first communication channel and the second communication channel.

Another particular implementation is directed to a mobile device, comprising: a wireless transceiver; and one or more processors configured to: identify a first communication channel enabled by the wireless transceiver; and select a second communication channel from among a plurality of candidate communication channels enabled by the wireless transceiver for establishing or maintaining a communication connection based, at least in part, on an assessment of an impact of distortion on at least one radio frequency receiving function from a combination of transmission on the first communication channel and transmission on the second communication channel.

Another particular implementation is directed to a storage medium comprising computer readable instructions stored thereon which are executable by a processor of a mobile device to: identify a first communication channel; and select a second communication channel from among a plurality of candidate communication channels for establishing or maintaining a communication connection based, at least in part, on an assessment of an impact of distortion on at least one radio frequency receiving function from a combination of transmission in the first communication channel and transmission in the second communication channel.

Another particular implementation is directed to a method, at a mobile device, comprising: identifying two or more candidate communication channels from a plurality of candidate communication channels based on an assessment of an impact of distortion on at least one impacted radio frequency receiving function from transmission in a combination of at least two of the two or more of the plurality of candidate communication channels; establishing a first communication connection for transmission in a first communication channel of the at least two of the two or more candidate communication channels; and establishing a second communication connection for transmission in a second communication channel of the at least two of the two or more candidate communication channels.

Another particular implementation is directed to a mobile device, comprising: a wireless transceiver; and one or more processors configured to: identify two or more candidate communication channels from a plurality of candidate communication channels based on an assessment of an impact of distortion on at least one impacted radio frequency receiving function from transmission in a combination of at least two of the two or more of the plurality of candidate communication channels; establish a first communication connection using the wireless transceiver for transmission in a first communication channel of the at least two of the two or more candidate communication channels; and establish a second connection using the wireless transceiver for transmission in a second communication channel of the at least two of the two or more candidate communication channels.

Another particular implementation is directed to a storage medium comprising computer readable instructions stored thereon which are executable by a processor of a mobile device to: identify two or more candidate communication channels from a plurality of candidate communication channels based on an assessment of an impact of distortion on at least one impacted radio frequency receiving function from transmission in a combination of at least two of the two or more of the plurality of candidate communication channels; establish a first communication connection for transmission in a first communication channel of the at least two of the two or more candidate communication channels; and establish a second communication connection for transmission in a second communication channel of the at least two of the two or more candidate communication channels.

It should be understood that the aforementioned implementations are merely example implementations, and that claimed subject matter is not necessarily limited to any particular aspect of these example implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1A:
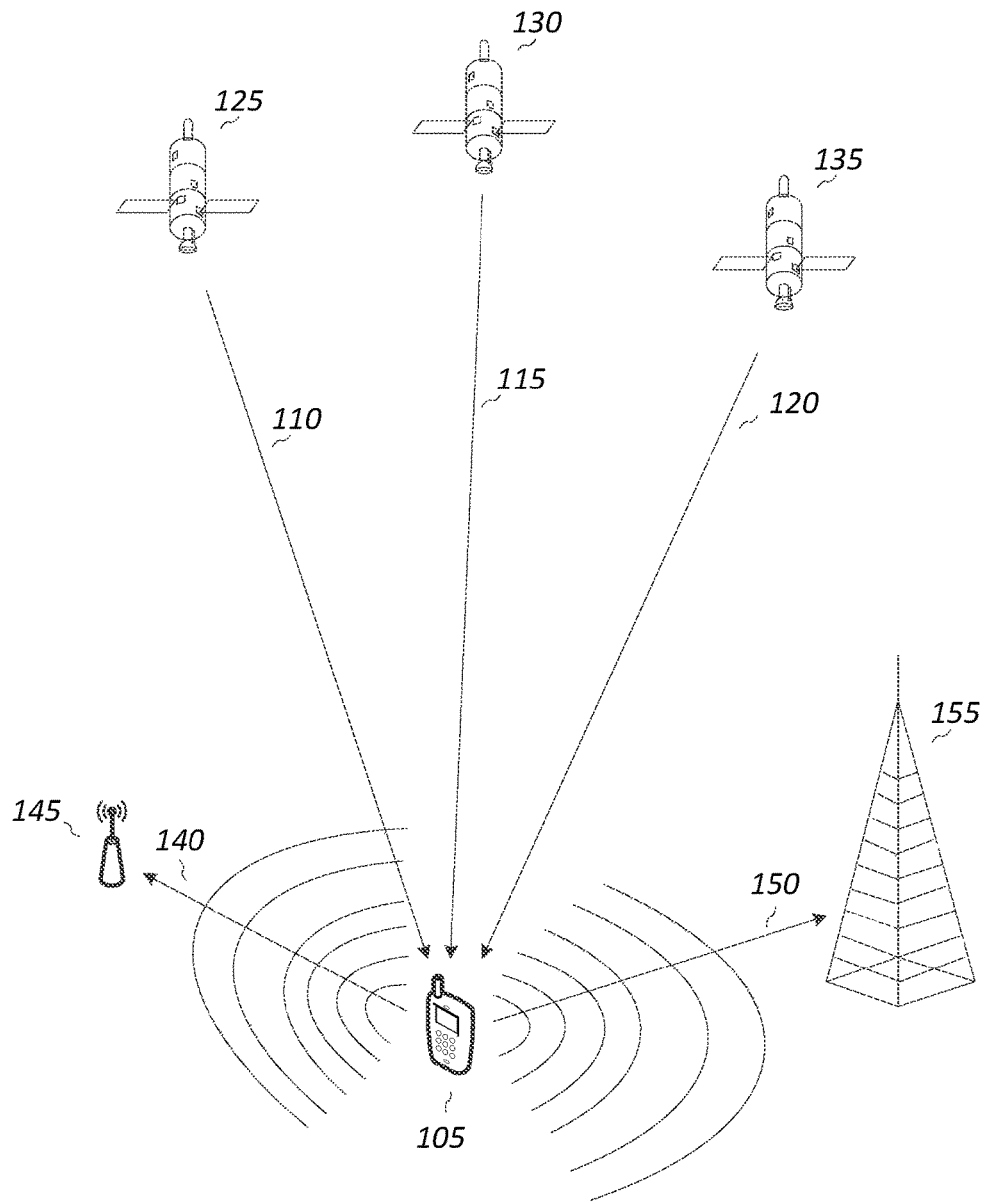
FIG. 1A is a system diagram illustrating certain features of a system containing a mobile device, in accordance with an implementation.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

The term Satellite Positioning System (SPS) is used herein to refer to various types of satellite positioning systems, including different Global Navigation Satellite Systems (GNSS), and/or regional positioning systems. For example, an SPS may comprise a Global Positioning System (GPS), Global Navigation Satellite System (GLONASS), Galileo, Beidou, and/or other type of satellite positioning system. In other implementations, an SPS may comprise any one several regional navigation satellite systems (RNSS) such as, for example, Wide Area Augmentation System (WAAS), European Geostationary Navigation Overlay Service (EGNOS), Quasi-Zenith Satellite System (QZSS), just to name a few examples. In particular implementations, an SPS may comprise one or more of these different types of systems used either alone or in conjunction with one another.

A common problem encountered by a mobile device having wireless communication capabilities as well as SPS capabilities is the coexistence of wireless communication and SPS systems within the mobile device. In particular, interference or "desensing," can occur when a mobile device attempts to simultaneously transmit wireless signals and receive SPS signals. The transmission of the wireless signals and/or an intermodulation product arising from such transmissions can lead to interference that impacts the proper reception of the SPS signals. For example, the interference may prohibit acquisition of one or more of the SPS signals, corrupt received SPS signals, reduce in the number/frequency of successfully received SPS signals such that SPS-based positioning is degraded, etc. Embodiments disclosed herein are directed to, among other things, managing transmission of wireless signals and reception of the SPS signals by the mobile device in order to address such "desensing" issues.

The term Radio Access Technology (RAT) is used herein to refer to any type of radio technologies used to transmit/receive signals, including but not limited to wireless wide area network (WWAN), wireless local area network (WLAN), personal area network (PAN), and the like.

Single or multiple concurrent RAT transmissions (e.g., WLAN and/or long term evolution (LTE)) introduce SPS (e.g., GNSS) desense issues for co-located multi-radio mobile devices. For example, concurrent operation of certain channels in the following bands: 2.4 GHz WLAN and 800 MHz WWAN may produce intermodulation products (IM2) in GNSS bands (2.4 GHz–800 MHz=1600 MHz in GNSS L1). In another example, concurrent operation of 5 GHz WLAN and 1700 MHz WWAN may result in intermodulation products (IM3) in GNSS bands (5 GHz–2×1700 MHz=1600 MHz in GNSS L1). In yet another example, Carrier Aggregation (2×UL CA) LTE/WWAN 800 MHz+ 1700 MHz and 2.4 GHz+5 GHz WLAN Dual Band Simultaneous (DBS) may introduce intermodulation products in GNSS bands (2.4 GHz–800 MHz & 5 GHz–2×1700 MHz=1600 MHz in GNSS L1).

To mitigate SPS desense issues produced by intermodulation (IM) interference, current methods may employ different approaches. One technique includes SPS blanking along with WLAN duty cycle limiting. Another technique includes reducing the transmission power of signals in the WLAN communication channels or LTE uplinks. However, these methods may lead to compromised performance on WLAN/LTE communications and may not be sufficient to avoid degrading of SPS signal processing during concurrent operation. While turning off an LTE or WLAN communication channel may reduce or eliminate intermodulation distortion, a connection on the turned off communication channel may be lost. In lieu of an SPS positioning operation impacted by intermodulation distortion, trilateration from terrestrial signals (e.g., WLAN or WWAN signals) may yield a position fix. Such a position fix using trilateration, however, may not yield a position fix for sufficient accuracy for some applications. Further, maintaining concurrent SPS, LTE and WLAN operation without degradation may be mandated for emergency operation (e.g., the FCC's Enhanced 911 (E911) mandate) where a caller's geographic position is transmitted on an LTE or WLAN communication channel while a voice call is maintained either on an LTE or WLAN communication channel.

In one implementation, SPS RX blanking may be performed during concurrent operation of WLAN and WWAN producing intermodulation (IM) products that desense SPS operation. In SPS receiver blanking method, SPS correlation may be inhibited during these RAT TX events. For example, sample memory may be zeroed out, and/or automatic gain control (AGC) may be frozen.

In some embodiments, in order to maintain SPS operation (with perhaps some sensitivity loss), WLAN may be duty cycled so that its RX event or idle time coincides with time intervals that an SPS receiver is to receive. Conversely, WLAN TX events may coincide with blanking the operation of the SPS receiver. WLAN duty cycle (TX active) is usually required to be less than 50% over any predefined (e.g., 20 milliseconds) decision unit interval to ensure correct operation of the SPS receiver. Duty-cycle limiting schemes require WLAN packet scheduling modifications, which degrade the WLAN throughput by up to one half. Additionally, a 3.0 dB reduction in sensitivity on the SPS receiver from blanking its operation half the time may lead to longer times to a position fix and reduced accuracy that may not satisfy Enhanced 911 (E911) emergency service mandates allowing less than 0.1 dB reduction in sensitivity for SPS processing.

One solution to avoid IM products that desense reception at an SPS receiver may include consolidating all outgoing communications on a single communication channel. In a particular scenario, by consolidating outgoing communications on a single communication channel, transmission of outgoing communications on either LTE or WLAN may be eliminated, thereby preventing intermodulation distortion arising from concurrent transmission on LTE and WLAN. However, access infrastructure (e.g., including WLAN AP and cellular base station) may not support consolidation while meeting a desired level of service to the client device. In one example scenario, an LTE communication channel may carry outgoing voice communication while a WLAN communication channel may carry outgoing data (or vice versa). Here, outgoing traffic flows in the different communication channels may be too dissimilar for consolidation in a single communication channel, and interoperability between the LTE and WLAN protocols may not be supported. Furthermore, a source and destination of the different outgoing traffic flows may be independent and distributed through different endpoints (e.g., eNode B and WLAN access point), preventing a combination of outgoing traffic flows. Another solution to avoid IM products that desense reception at an SPS receiver may include fractional allocation of outgoing traffic flows to a number of particular RATs. This may include, however, simultaneous transmission in different communication channels for even a fractional duration of time that creates intermodulation distortion impacting an RF receiving function. Furthermore, this may not be possible for the interoperability reasons mentioned above.

According to an embodiment, a mobile device maintaining a first connection for outgoing traffic in a first communication channel may select from among a plurality of candidate communication channels for establishing or maintaining a second connection for outgoing traffic. In an example implementation, the first communication channel may comprise an LTE communication channel and the plurality of candidate communication channels may comprise communication channels in a wireless local area network (WLAN). Selection from among a plurality of candidate communication channels for establishing or maintaining a second communication connection for outgoing traffic may be based, at least in part, on an assessment of an impact of distortion on at least one radio frequency (RF) receiving function from a combination of transmission on the first connection and transmission on the second connection. This may enable the mobile device to meet a desired level of service while ameliorating any impact of intermodulation distortion on an RF receiving function.

According to an embodiment, a mobile device may select a communication channel for establishing a second communication connection in response to any one of several events. In one example, a mobile device while initially transmitting outgoing traffic on two different RATs with an SPS receiver turned off may be interrupted by a request for processing SPS signals for a position fix (e.g., in response to an emergency event). If transmission of outgoing traffic on the two different RATs introduces intermodulation distortion desensing the SPS receiver, the mobile device may select a new communication channel for the transmission of outgoing traffic to replace a communication channel enabled by one of the two RATs. Here, the new communication channel may be selected such that transmission of outgoing traffic in the new communication channel, in combination with transmission of outgoing traffic in another communication channel, does not impart distortion substantially affecting or desensing an RF receiving function such as processing SPS signals.

In another example, one of two different RATs used for transmitting outgoing traffic may implement an initial WLAN communication channel during SPS signal processing that is reassigned by an access point to a subsequent WLAN communication channel. Transmission of outgoing traffic in the initial WLAN communication channel in combination with transmission of outgoing traffic on the communication channel of the other RAT may not introduce intermodulation distortion desensing SPS signal processing. However, transmission of outgoing traffic in the subsequent WLAN communication channel in combination with transmission of outgoing traffic in the other RAT may indeed introduce intermodulation distortion desensing SPS signal processing. As such, and as discussed below, instead of using the subsequent WLAN communication channel assigned by the access point, the mobile device may select a WLAN communication channel other than the initial WLAN communication channel and subsequent WLAN communication channel. Here, the WLAN communication channel may be selected such that transmission of outgoing traffic in the selected WLAN communication channel, in combination with transmission of outgoing traffic in the communication channel of the other RAT, does not impart distortion substantially affecting or desensing an RF receiving function such as processing SPS signals.

In another example scenario, a mobile device may transmit outgoing traffic using a first RAT in an initial LTE communication channel and using a second RAT in an initial WLAN communication channel where the LTE communication channel is reassigned by an eNodeB device while the mobile device is processing SPS signals at an SPS receiver. Transmission of outgoing traffic in the initial WLAN communication channel in combination with transmission of outgoing traffic on the initial LTE communication channel may not introduce intermodulation distortion desensing SPS signal processing. However, transmission of outgoing traffic in the initial WLAN communication channel in combination with transmission of outgoing traffic in the reassigned LTE communication channel may indeed introduce intermodulation distortion desensing SPS signal processing. In response to reassignment of the LTE communication channel, the mobile device may select a subsequent WLAN communication channel to replace the initial WLAN communication channel for transmitting outgoing traffic. Here, the subsequent WLAN communication channel may be selected such that transmission of outgoing traffic in the subsequent WLAN communication channel, in combination with transmission of outgoing traffic in the reassigned LTE communication channel, does not impart distortion substantially affecting or desensing an RF receiving function such as processing SPS signals.

FIG. 1A illustrates a diagram of an environment 100 in which reception of SPS signals by a mobile device may be desensed during transmission of wireless signals by the mobile device. As shown, environment 100 includes a mobile device 105. Mobile device 105 may comprise a device designed to perform numerous functions, including the ability to obtain measurements indicative of its own location based on the reception of SPS signals from satellites.

Mobile device 105 is able to perform satellite-based positioning by receiving SPS signals from one or more satellites. Such satellite-based positioning techniques are well-known and only briefly described below. As shown here, mobile device 105 receives SPS signals 110, 115, and 120 from satellites 125, 130, and 135, respectively. SPS signals 110, 115, and 120 may include timing parameters relating to the timing of portions of SPS signal as transmitted from the respective satellite. An SPS signal may also include ephemeris information which can be used to estimate the location of the satellite at the time the SPS signal is transmitted. Mobile device 105 is able to measure time of receipt of SPS signals 110, 115, and 120. The transmission time and reception time of an SPS signal may be aligned on a common timing reference, such as a common clock, known to the mobile device 105. By taking the difference between the reception time and transmission time, mobile device 105 may compute the "flight time" associated with each SPS signal, for it to travel from the respective satellite to mobile device 105. The flight time may then be used to measure a distance between a satellite and mobile device, taking into account the speed of light. Once distances between multiple satellites and mobile device 105 is measured, trilateration may be used to estimate the location of mobile device 105, based on the known location of satellites and the measured distances between satellites and mobile device 105.

In addition to satellite-based positioning, one category of functions performed by mobile device 105 relates to wireless communications. Wireless communications may serve a link in connecting mobile device 105 over private and/or public networks with other devices such as servers and other user equipment. This may include communication over various types of wireless networks, including wireless local area networks (WLAN) and wireless wide area networks (WWAN), among others. Examples of WLANs may be different types of Wi-Fi networks, such as those implemented based on various IEEE 802.11 standards. The example in FIG. 1A focuses on wireless communications between mobile devices and base stations. However, other examples of wireless communications may include peer-to-peer communications between mobile devices such as Wi-Fi Direct, Long-Term Evolution (LTE) Direct, etc. Examples of WWAN RATs may include LTE, wideband code division multiple access (WCDMA), and the like. Additional examples of wireless communications may include near field communications (NFC), Bluetooth communications, etc. Embodiments of the present invention, including selection of radio access technologies (RATs) and/or control of transmission of wireless signals to avoid "desensing," may be implemented with different types of wireless communication signals.

In the example shown in FIG. 1A, mobile device 105 may be able to perform wireless communications by transmitting signals to, and/or receiving signals from, one or more base stations 155. For instance, mobile device 105 may send a WLAN signal 140 to a local area transceiver 145, which may be a base station supporting WLAN communications. In general, the local area transmitter may be an access point, a beacon or any combination thereof. The local area transmitter may operate under WLAN, Bluetooth, or any other radio technology.

Mobile device 105 may transmit a WWAN signal 150 to cell tower 155, which may comprise a base station supporting WWAN communications. For instance, WLAN signal 140 and/or WWAN signal 150 transmitted by mobile device 105 may include an HTTP request for a web page the user of mobile device 105 may wish to retrieve from the Internet. Not shown in FIG. 1A are the wireless signals that mobile device 105 may receive back in response to the request. For example, such signals may be transmitted to mobile device 105 from local area transmitter 145 and/or cell tower 155 and may include an HTTP response containing the HTML file constituting the requested web page. FIG. 1A highlights the wireless signals transmitted from mobile device 105 (as opposed to wireless signals received by mobile device 105).

According to an embodiment, if mobile device 105 simultaneously attempts to receive SPS signals such as 110, 115, and 120 and transmit wireless signals such as 140 and 150, interference may occur to "desense" the proper reception of the SPS signals. This can occur if received SPS signals 110, 115, and 120 and transmitted wireless signals 140 and 150 utilize common or overlapping frequencies. The interference may also be produced by spectral emissions from adjacent or close frequency bands. This can also occur even while received SPS signals 110, 115, and 120 and transmitted wireless signals 140 and 150 do not utilize common or overlapping frequencies, but intermodulation products introduce interference.

In particular scenarios, many factors may affect whether a RAT transceiver's transmissions interfere with the reception of SPS signals by an SPS receiver. In some situations, a transmission frequency being used by the RAT transceiver may not significantly interfere with the SPS receiver. In some situations, the RAT transceiver may be transmitting at a low enough power that the RAT transceiver may introduce little or no interference with the SPS receiver. In other situations, the RAT transceiver's spectral emissions or harmonics may introduce interference with the SPS receiver. If certain multiple RAT transceivers of a device are transmitting concurrently, various harmonic and/or intermodulation distortion at various frequencies may be created that may interfere with signal acquisition at the SPS receiver (as described above).

Figure 1B:
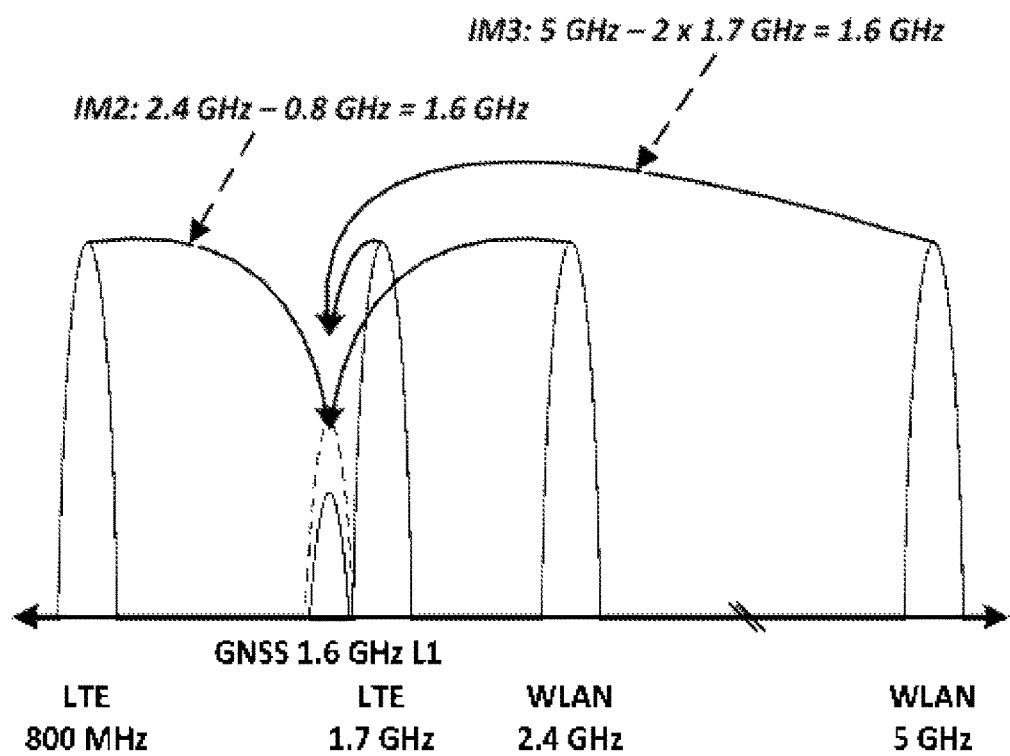
FIG. 1B is a plot of intermodulation products that may impact one or more receiving functions in accordance with an implementation.

FIG. 1B is a plot illustrating how harmonic or intermodulation distortion arising from transmission on multiple communication channels may desense an RF receiving function according to an embodiment. Such harmonic or intermodulation distortion may arise, for example, from concurrent transmission of outgoing traffic from mobile device 105 to local area transceiver 145 and outgoing traffic from mobile device 105 to one or more base stations 155. Here, an example RF receiving function comprises processing GNSS signals at the L1 band about 1.6 GHz. Other receiving functions (not shown) may include the processing of Bluetooth signals. As illustrated, concurrent transmission on LTE at channels in the 800 MHz band and WLAN channels at the 2.4 GHz band may create an intermodulation product IM2 impacting the processing of GNSS signals at about 1.6 GHz. Similarly, concurrent transmission on LTE channels at the 1.7 GHz bands and WLAN channels at the 5 GHz band may create an intermodulation product IM3 impacting or desensing the processing of GNSS signals at about 1.6 GHz. It should be understood that FIG. 1B merely illustrates example scenarios in which concurrent transmission in multiple communication channels may create intermodulation distortion products impacting an RF receiving function, and claimed subject matter is not limited in this respect.

Figure 2:
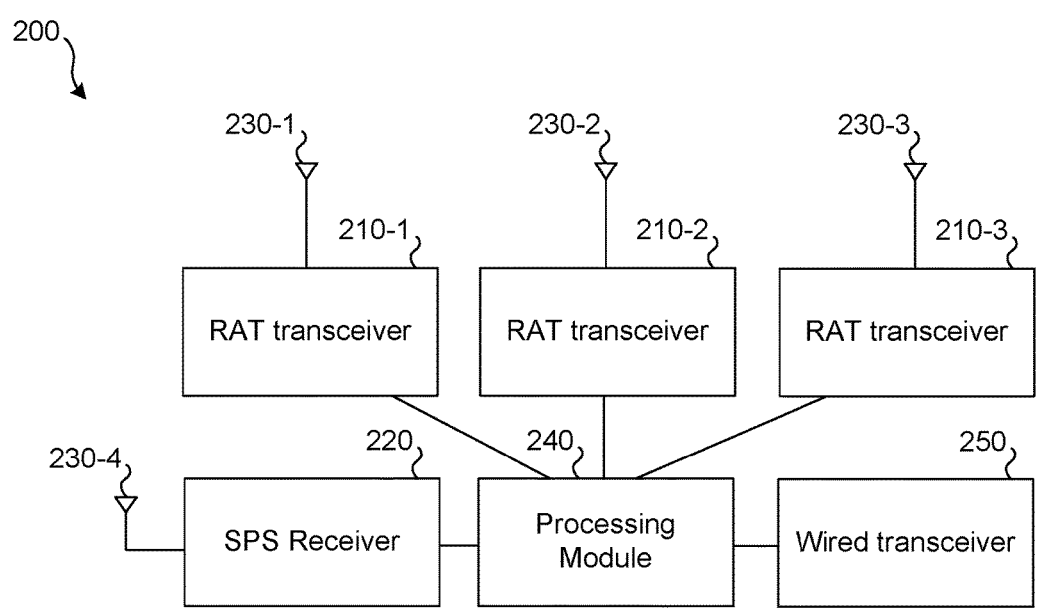
FIG. 2 is a schematic diagram showing features of a mobile device according to an embodiment.

FIG. 2 is a schematic diagram of a device 200 that includes an SPS receiver and multiple RAT transceivers. Device 200 includes three RAT transceivers 210-1, 210-2, and 210-3, SPS receiver 220, antennas 230-1, 230-2, 230-3, and 230-4, processor 240, and wired transceiver 250. Device 200 may comprise a mobile, wireless device, a cellular telephone, a tablet computer, an Internet of Things (IoT) device, a wearable computing device, an automobile, an automotive device, a dedicated SPS receiver device (e.g., a car navigation device) or any other device that is capable of determining its position using an SPS receiver and communicating via one or more RAT transceivers.

In device 200, three RAT transceivers 210 are present. At various times, each of these RAT transceivers 210 may transmit signals wirelessly via associated antennas 230. RAT transceivers 210 may be transmitting while no other RAT transceiver is transmitting or may transmit concurrently while one or more other RAT transceivers of RAT transceivers 210 are transmitting. Therefore, at a given time, zero, one, or more than one RAT transceivers of RAT transceivers 210 may be transmitting wireless signals.

A particular RAT transceiver 210 may correspond to a particular wireless technology/protocol. For example, RAT transceiver 210-1 may correspond to one or more of cellular communication protocols, such as 4G LTE, 3G, or GSM. RAT transceiver 210-2 may correspond to one or more wireless local area network protocols such as 802.11a/b/g/ac/ad/ax/ah. RAT transceiver 210-3 may correspond to a device-to-device communication technology/protocol, such as Bluetooth®. In some embodiments, one or more RAT transceivers may correspond to the same technology/protocol. In some embodiments, each of the transceivers may support multiple protocols (e.g., cellular communication protocols, wireless local area network protocols, device-to-device or any other protocols.) While the illustrated embodiment of device 200 contains three RAT transceivers, it should be understood that this is for illustration purposes only; one, two, or more than three RAT transceivers may be present in alternate embodiments of device 200.

Each of RAT transceivers 210 may be associated with an antenna. For example, RAT transceiver 210-1 may use antenna 230-1 to transmit (and, possibly, receive) wireless signals; RAT transceiver 210-2 may use antenna 230-2 to transmit (and, possibly, receive) wireless signals; and RAT transceiver 210-3 may use antenna 230-3 to transmit (and, possibly, receive) wireless signals. In some embodiments, two or more RAT transceivers of RAT transceivers 210 may share a single antenna. Also, one or more RAT transceivers of RAT transceivers 210 may transmit using two or more antennas. A RAT transceiver of RAT transceivers 210 may be permitted to switch transmission from a first antenna to a second antenna. In some embodiments, it may also be possible that SPS receiver 220 may share an antenna with one or more RAT transceivers 210.

RAT transceivers 210 may be in communication with processor 240. The processor may be an application processor, baseband processor, and/or any other type of processor. Messages may be received from processor 240 for transmission and received data may be provided to processor 240. Processor 240 may represent one or more processors in communication with non-transitory processor-readable memory. Processor 240 may be responsible for execution of a high-level operating system (HLOS) and/or the execution of one or more applications that use one or more RAT transceivers of RAT transceivers 210 to transmit data and/or uses locations determined by SPS receiver 220.

SPS receiver 220 may comprise a standalone component (e.g., a separate integrated circuit chip, such as a radio frequency (RF) chip) or may be a part of a processor 240. For instance, some processors can have an SPS receiver onboard. Whether integrated into a multi-purpose processor or a standalone component, SPS receiver 220 may be capable of determining its position based, at least in part, on received SPS signals. Such SPS signals may be received via antenna 230-4. Antenna 230-4 may be dedicated to SPS receiver 220 or may be shared with one or more other components, such as one or more of RAT transceivers 210.

Any of RAT transceivers 210 transmitting may or may not interfere with successful reception and processing of SPS signals by SPS receiver 220. Whether any or sufficient interference occurs to affect the performance (e.g., reception, processing and/or acquisition) of SPS receiver 220 may depend on various operating characteristics of RAT transceivers: the frequency on which RAT transceivers are transmitting, the power level at which RAT transceivers are transmitting, and/or which antennas RAT transceivers are using. If two or more RAT transceivers of RAT transceivers 210 are transmitting concurrently, interference at one or more harmonic and/or intermodulation distortion at particular frequencies may be created that otherwise would not exist. Interference at such frequencies may not be created if the RAT transceivers were not transmitting concurrently. Moreover, transmissions from each of the RAT transceivers 210 may introduce interference at harmonics of their transmission frequency.

According to an embodiment, and as pointed out above, harmonic and/or intermodulation distortion (e.g., interfering with at least one radio frequency (RF) receiving function) may arise from concurrent transmission of outgoing traffic in signals at a combination of RAT transceivers 210. Such harmonic and/or intermodulation distortion interfering with processing of GNSS signals at SPS receiver 220 may arise, for example, from concurrent transmission of signals in pairs including WLAN communication channels within particular bands and a WWAN communication channel within particular bands including: 1) 2.4 GHz WLAN and 800 MHz WWAN IM2; 2) 5 GHz WLAN and 1700 MHz WWAN IM3; and 3) 2.4 or 5 GHz WLAN and LTE/WWAN uplink carrier aggregation (ULCA) at 800 MHz and 1700 MHz. It should be understood that these are merely examples of combinations of concurrent WLAN and WWAN transmissions that may introduce harmonic and/or intermodulation distortion. Other combinations may include, for example transmission in an IEEE std. 802.11 at the 2.4 GHz, 5 GHz or 60 GHz bands in combination with LTE transmission at current and future bands. In other scenarios, harmonic and/or intermodulation distortion interfering with an RF receiving function may arise, for example, from concurrent transmission of uplink signals in pairs of WWAN communication channels including: 1) LTE communication channels implementing ULCA; 2) dual SIM dual active (DSDA); 3) simultaneous Global System for Mobile Communications (GSM) EDGE (Enhanced Data Rates for Global Evolution) Radio Access Network (GERAN) and LTE; 4) simultaneous GERAN and Time Division-Synchronous Code Division Multiple Access (TD-SCDMA) and 5) simultaneous voice on GSM or CDMA with LTE (SVLTE). Such harmonic and/or intermodulation distortion interfering with an RF receiving function may also arise, for example, from concurrent transmission of signals in pairs of WLAN communication channels including: 1) dual band simultaneous (DBS) IEEE std. 802.11a/b/g/n/ac/ax/ah; 2) triple band simultaneous (TBS) IEEE std. 802.11ad; and 3) combinations of future WLAN bands.

In addition to interference being caused by RAT transceivers 210, interference on the SPS receiver may be introduced by one or more wired transceivers, such as wired transceiver 250. A wired transceiver 250 may be configured to transmit and/or receive data via a connected wire, such as via a USB3 wired connector and protocol. While a single wired transceiver 250 is depicted in FIG. 2, it should be understood that no wired transceivers or more than one wired transceiver may be present. Wired transceiver 250 may be in communication with processor 240. Messages (e.g., including, but not limited to, text messages, voice communication, data, streaming and video) may be received from processor 240 for transmission and received data may be provided to processor 240.

Embodiments detailed herein may be applicable during instances in which no RAT transceivers are present or operating. In such embodiments, interference may be introduced by other sources, such as power supplies, external devices, and/or other internal componentry.

Whether or not any or sufficient interference occurs to affect the performance of SPS receiver 220 may further depend on the current operating characteristics of SPS receiver 220. Furthermore, in particular implementations, whether or not any or sufficient interference occurs to affect performance of SPS receiver 220 may depend on a degree of isolation between or among antennas 230 (e.g., for SPS, WLAN and WWAN). For example, sufficient interference to affect performance of SPS receiver 220 may depend on whether any antennas 230 are shared between or among SPS receiver 220 and/or RAT transceivers 210s. The proximity (distance) between SPS receiver 220 (and antenna 230-4) to the SPS space vehicles (SVs) from which SPS signals are being received and processed may affect how much interference can be tolerated. The SPS constellation and/or the specific SVs within the constellation being used may affect how interference affects the SPS receiver because of different frequencies, power levels, SV health, obstructions (due to the direction of the constellation's SVs in relation to the SPS receiver), and/or orthogonality scheme.

In one scenario, RAT transceivers 210 may support multiple concurrent communication channels including, for example, a first uplink communication channel for transmitting uplink messages according to a first RAT (e.g., using a WLAN protocol) and a second RAT (e.g., using a WWAN protocol). Under certain conditions, as pointed out above, concurrent transmission of outgoing traffic on multiple outgoing communication channels using different RATs may introduce harmonic and/or intermodulation distortion that may interfere with the acquisition of SPS signals received at SPS receiver 220.

As discussed above, multiple different techniques may be used for addressing impacts on an RF receiving function arising from intermodulation distortion introduced by transmission of outgoing traffic on multiple communication channels (e.g., consolidation of outgoing traffic on a single communication channel). For example, outgoing traffic transmitted in a first communication channel according to a WLAN protocol (e.g., using RAT transceiver 230-1) may be consolidated with outgoing traffic transmitted in a second communication channel according to a WWAN protocol (e.g., using RAT transceiver 230-2). In an implementation, wireless cellular infrastructure in a WWAN may be capable of forwarding to a destination outgoing messages that may otherwise be transmitted in a WLAN communication channel. As pointed out above, if harmonic and/or intermodulation distortion from outgoing traffic in WLAN and WWAN communication channels interferes with processing of SPS signals at a receiver, outgoing messages for transmission on the WLAN communication channel may be consolidated with outgoing messages on the WWAN communication channel. Transmission on the WLAN communication channel may then be suspended to avoid harmonic or intermodulation distortion impacting or desensing an RF receiving function.

Figure 3:
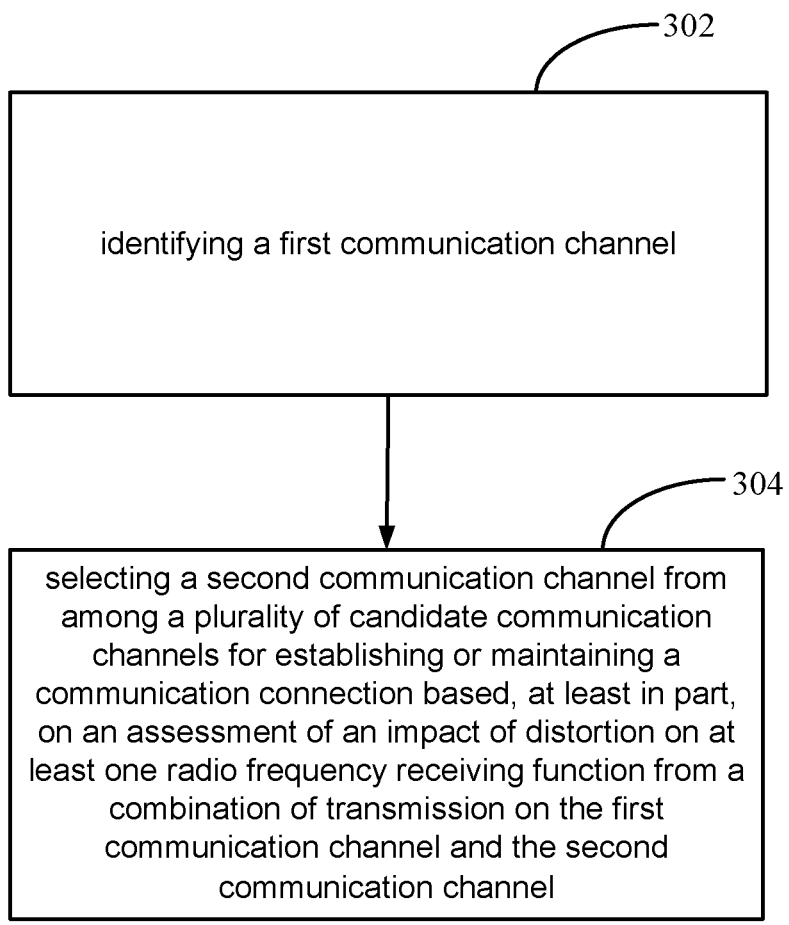
FIG. 3 is a flow diagram of a process according to an embodiment.

In other scenarios, however, messages for transmission of outgoing message traffic on a first communication channel using a first RAT may not be consolidated with messages for transmission of outgoing message traffic on a second communication channel using a second RAT. For example, message throughput on a single communication channel may not be sufficient to sustain a particular level of service in supporting an application. Also, operation of two or more concurrent applications may require two or more RATs to be active concurrently. Accordingly, in these scenarios and as pointed out above, harmonic and/or intermodulation distortion may not be avoided by consolidating messages for transmission on a first communication channel of a WLAN network with messages for transmission on a second communication channel of a WWAN network. FIG. 3 is a flow diagram of a process, according to an embodiment, to select an additional communication channel for transmitting outgoing messages that may enable reducing or eliminating interfering intermodulation distortion without consolidating outgoing messages with a different communication channel. In one implementation, as discussed below, a mobile device may transmit outgoing messages on an assigned communication channel, selected and implemented according to any one of several techniques. Such techniques may include, for example, a Fast Session Transfer (FST) procedure as set forth in IEEE 802.11 ad, a Fast Initial Link Setup (FILS) procedure as set forth in IEEE 802.11ai or a Basic Service Set (BSS) Transition Management procedure as set forth in IEEE 802.11k, r and v, just to provide a few examples. However, this channel assignment by the external AP may introduce intermodulation distortion affecting an RF receiving function on the mobile device. In other techniques, the WLAN on the mobile device may act in an access point mode, known as a softAP. In such an access point mode, a mobile device may control channel assignment to external client devices associated with the mobile device to employ "tethering" where client devices connect to a UE WLAN, and aggregated data traffic is transmitted from the mobile device on an LTE connection acting as a backhaul link. In such a particular implementation of a softAP feature in a mobile device, the mobile device may potentially choose particular channels in channel assignment so as not to introduce intermodulation distortion to an RF receiving function on the mobile device. In one embodiment, a mobile device operating a WLAN RAT may be configured as a STA client device that does not directly control a channel assignment from an AP. Below is described a technique for a mobile device configured as a STA client to change a channel assignment by means of scanning and associating to available channels of an external AP or multiple APs. This may enable a mobile device configured as a STA client to select channels that don't impact an RF receiving function on the mobile device. In other techniques, as described below with reference to FIG. 4 in one particular example, a mobile device client (WLAN in station (STA) mode on the mobile device) may control selection of and transition to a subsequent WLAN communication channel from among multiple WLAN communication channels served by the AP discovered by performing scanning operations. The mobile device configured as an STA client may then associate to particular channels that do not introduce intermodulation distortion products affecting an RF receiving function of the mobile device. In a particular implementation, scanning may involve, for example, a mobile device configured as a STA client tuning onto beacon transmissions of APs (or actively probing for beacons). The mobile device configured as a STA client may then exchange authentication request/response messages with APs, followed by an exchange of association request/response messages, followed by a connection.

In a particular implementation, actions set forth in FIG. 3 may be performed by a mobile device (e.g., including features as shown in FIG. 2). Block 302 may identify a first communication channel using any one of the aforementioned RATs that may be used for transmitting outgoing traffic such as messages including text messages, voice communication, data, streaming, video, just to provide a few examples. One or more conditions may then arise such that communication in a second communication channel may be desired. In one example, as pointed out above, two different RATs may be desired to support independent traffic flows that cannot be combined in the same channel. In another example, if available throughput on a first connection established in the first communication channel would not be sufficient to meet a desired level of service of a current application executing on a mobile device, a second connection established in a second communication channel may be established to thereby increase collective outgoing traffic throughput. It should be understood, however, that this is merely an example of a condition in which a second connection in a second communication channel may be desired, and claimed subject matter is not limited in this respect. In this context "communication channel" as referred to herein means a defined resource for transmission of messages between devices in a transmission medium. In one example, a communication channel may be characterized, at least in part, by a particular frequency channel of a particular transmission band in a wireless transmission medium which may be allocated for transmission of messages (e.g., voice or data) between two devices. A "communication connection" as referred to herein means a state established between a first device and a second device such that the first device may transmit messages to the second device in a communication channel according to a protocol. For example, at least a portion of a communication connection may, at least in part, be established in, or facilitated by, a frequency band of a communication channel between a mobile device and an access device (e.g., eNode B or WLAN access point) to enable the mobile device to transmit outgoing messages to the access device. In another example, a communication connection may be initially established between two devices, at least in part, in a first communication channel. In an implementation, the communication connection initially established in or using the first communication channel may be maintained following substitution of the first communication channel by a second communication channel. For example, a communication connection between devices based on an Internet protocol may be maintained despite changes in a communication channel facilitating the communication connection.

While a first communication connection is established in a first communication channel, block 304 may comprise selecting among a plurality of candidate communication channels for establishing or maintaining a second communication connection. In one particular implementation, a first communication channel may comprise a WWAN (e.g., LTE) communication channel and a third communication channel may comprise a WLAN communication channel. Here, a second communication connection may be established between a mobile device and another device over at least a third communication channel. In an embodiment, the second communication connection maintained on the third communication channel may be transitioned, at least in part, from the third communication channel to the second communication channel. Here, candidate communication channels for establishing or maintaining the second communication connection may be determined using any one of several techniques such as, for example, a mobile device performing an active or passive scan of available communication channels to local access points in a WLAN. In one scenario, a mobile device may maintain a pre-existing second communication connection on a communication channel selected at block 304 using one of the aforementioned FST, FILS or BSS Transition Management procedure identified above without loss of Internet Protocol connectivity. In another scenario, a mobile device may establish a new connection on a communication channel selected at block 304 using a cold start.

As pointed out above, a second communication connection established or maintained on a second communication channel, in combination with a first connection in a first communication channel as identified at block 302, may introduce intermodulation or harmonic distortion that desenses one or more RF receiving functions (e.g., processing SPS signals for positioning operations). Certain techniques for selecting a communication channel for establishing or maintaining a connection may be based primarily on received signal strength for a signal received at a mobile device from an access device through the communication channel (and, by inference, received signal strength of a signal from the communication channel received at a second device). Block 304, on the other hand, may select from among multiple candidate communication channels for establishing or maintaining a second connection for outgoing traffic (and possibly incoming traffic) based, at least in part, on an assessment of an impact of distortion (e.g., intermodulation or harmonic distortion) on at least one RF receiving function.

Block 304 may, using any one of several techniques discussed herein, determine that transmission of outgoing traffic in a particular communication channel (e.g., in combination with transmission of outgoing traffic in one or more other communication channels) likely interferes with at least one radio frequency (RF) receiving function. In particular implementations, different candidate communication channels may be associated with different RSSI values. For each of the candidate communication channels, a particular RSSI value may be associated with the candidate communication channel. For example, In addition to assessing impact of intermodulation distortion, block 304 may assess expected received signal power of a signal received at a receiving device. For example, block 304 may first identify multiple different communication channels any one of which, in combination with transmission in the first communication channel, may not impart a significant intermodulation distortion effect on an RF receiving function of interest. From the identified multiple different communication channels (that do not impart a significant intermodulation distortion effect on an RF receiving function of interest), block 304 may select a particular communication channel having a largest associated RSSI establishing or maintaining a communication connection. For example, communication channels identified as not imparting a significant intermodulation distortion effect on an RF receiving function of interest may be ranked from the communication channel associated with a highest RSSI value to the communication channel associated with a lowest RSSI value. Thus, in selecting from candidate communication channels for establishing a second communication connection, block 304 may apply multiple criteria including an assessment of an impact of intermodulation distortion and expected received signal power. It should be understood, however, that block 304 may apply other or different criteria in selecting a communication channel for establishing a second communication connection, and that claimed subject matter is not limited in this respect.

A radio frequency receiving function may include, for example, acquisition of SPS signals for use in positioning operations, acquisition of messages on a particular RAT (e.g., Bluetooth, WLAN or WWAN), just to provide a couple of examples. Block 304 may assess a degree to which expected or predicted intermodulation or harmonic distortion introduced by a first communication connection identified at block 302 and a second communication connection on a candidate communication channel may prevent reliable acquisition of signals at a receiver (e.g., receiving a processing signal at SPS receiver 220 with sufficient reliability for a positioning operation). As pointed out above in a particular implementation, such interference may comprise intermodulation or harmonic distortion arising from outgoing message traffic transmitted using different RATs. This may occur, for example, if a communication connection on a candidate communication channel in a second wireless communication network is transmitted using a second RAT (e.g., according to a WLAN protocol such as a version of IEEE std. 802.11 transmitting in channels at the bands 2.4 GHz, 5 GHz or 60 GHz) and while a mobile device is transmitting messages in a first communication connection in a first communication network using a first RAT (e.g., according to a WWAN protocol such as one or more of the aforementioned cellular communication protocols). In other embodiments, block 304 may determine whether interfering intermodulation or harmonic distortion would likely occur from transmission of outgoing message traffic in the assigned communication channel in the second wireless communication network concurrent with transmission of outgoing message traffic in an active first communication channel in the same wireless communication network (e.g., IEEE std. 802.11a/b/g/n/ac/ax/ah or IEEE std. 802.11ad).

In one implementation, block 304 may determine that outgoing message traffic transmitted in different communication channels likely introduces intermodulation or harmonic distortion interference using a look up table. Such a look up table, for example, may associate two different communication channels to identify particular RF receiving functions (e.g., including acquisition of an SPS signal in a particular band) that are likely to experience intermodulation interference from transmission of outgoing message traffic on the two different communication channels. In another implementation, block 304 may comprise computing a level of intermodulation distortion to occur at a frequency band of an RF receiving function, and then determining whether the computed level of intermodulation distortion significantly affects or degrades the RF receiving function. For example, particular levels of intermodulation distortion may be computed based on a combination of particular parameters characterizing transmitted signals such as carrier frequency and frequency bandwidths. Furthermore, in determining whether any identified intermodulation distortion is likely to interfere with an RF receiving function, block 304 may assess a level of signal power of the identified intermodulation distortion (e.g., expected of predicted signal power of particular harmonic spectral components) residing in frequency bands of the impacted RF receiving function. It should be understood, however, that these are merely examples of how a mobile device may determine whether transmission of outgoing message traffic in a communication channel (e.g., in combination with transmission of outgoing message traffic on a different communication channel) likely interferes with an RF receiving function, and claimed subject matter is not limited in this respect.

According to an embodiment, actions at block 304 may be initiated in response to any one of several events as discussed above. In one example, actions at block 304 may be initiated in response to an activation of the at least one radio frequency receiving function while transmitting outgoing traffic on two different communication channels. Here, block 304 may select a communication channel to replace one of the two different communication channels to thereby reduce or eliminate intermodulation distortion affecting the RF receiving function. In the particular example in which the at least one RF receiving function comprises processing SPS signals at a receiver, for example, activation of the at least one radio frequency receiving function may occur in response to a request for a position fix in support of a navigation application or in response to a request for a position fix in connection with an E911 emergency service event.

In another example, actions at block 304 may be initiated while a mobile device is performing an RF receiving function and transmitting outgoing traffic on two different initial communication channels in response to a reassignment of one of the two different communication channels (e.g., a reassignment of a WLAN communication channel initiated by a WLAN access point or a reassignment of an LTE communication channel initiated by an eNode B device). While transmitting outgoing traffic on the two different initial communication channels may not impart significant intermodulation distortion affecting or desensing the RF receiving function, a reassigned communication channel in combination with a remaining initial communication channel may indeed impart intermodulation distortion desensing the RF receiving function.

Responsive to a determination that transmission of outgoing message traffic in a combination of communication channels likely introduces intermodulation or harmonic distortion that interferes with at least one radio frequency function as determined at block 304, block 304 may initiate communication in an alternative communication channel (e.g., an alternative to transmission of outgoing message traffic in the combination of channels). In one embodiment, in response to a probe response message from an access point indicating available candidate communication channels, the mobile device may transmit an acknowledgement message on a selected alternative communication channel for establishing or maintaining a communication connection. The mobile device may then transmit outgoing message traffic in the alternative communication channel. In an example implementation, transition to communication in an alternative communication channel may be implemented using one or more features set forth in IEEE std. 802.11k and 802.11v. For example, features to facilitate roaming may be used to associate and switch to a specific alternative communication channel on a single access point or multiple access points. Features of IEEE std. 802.11k may, for example, enable creation of a list of communication channels (e.g., which allows a mobile device to select a communication channel from a new target access point if signal of a currently serving access point weakens). Transition management features of IEEE std. 802.11k may, for example, enable a network's control layer to influence selection of a new communication channel (e.g., on a new access point) using particular criteria. For example, at block 304 a mobile device may transmit a message to a currently serving access point to provide a list of other neighboring access points. The mobile device may then select from among listed neighboring access points for identifying an alternative communication channel. For example, in the course of an active scanning procedure, a mobile device may transmit an acknowledgement message on a selected communication channel identified in a probe response message to enable transmission of outgoing traffic on the selected communication channel.

According to an embodiment, block 304 may, responsive to determining that transmission in the assigned communication channel likely interferes with at least one RF receiving function, initiate a scan to discover available candidate communication channels that may be selected for use as an alternative communication channel. For example, block 304 may employ an active scan to determine available candidate communication channels as discussed above. Alternatively, block 304 may initiate a passive scan procedure to acquire beacon signals from neighboring access points to determine available candidate communication channels. Available candidate communication channels may comprise candidate communication channels with an access point assigning the assigned communication channel or communication channels with other access points in a network. As discussed above in a particular implementation, block 304 may select from available candidate communication channels (e.g., identified in an active or passive scan) for establishing a connection and transmit an acknowledgement message on the selected candidate communication channel.

In one implementation, a mobile device may transition to communication on a communication channel selected at block 304 such as one of the aforementioned FST, FILS or BSS Transition Management procedure identified above without loss of Internet Protocol connectivity. Alternatively, a mobile device may initiate a connection on a selected new channel from a cold start.

Figure 4:
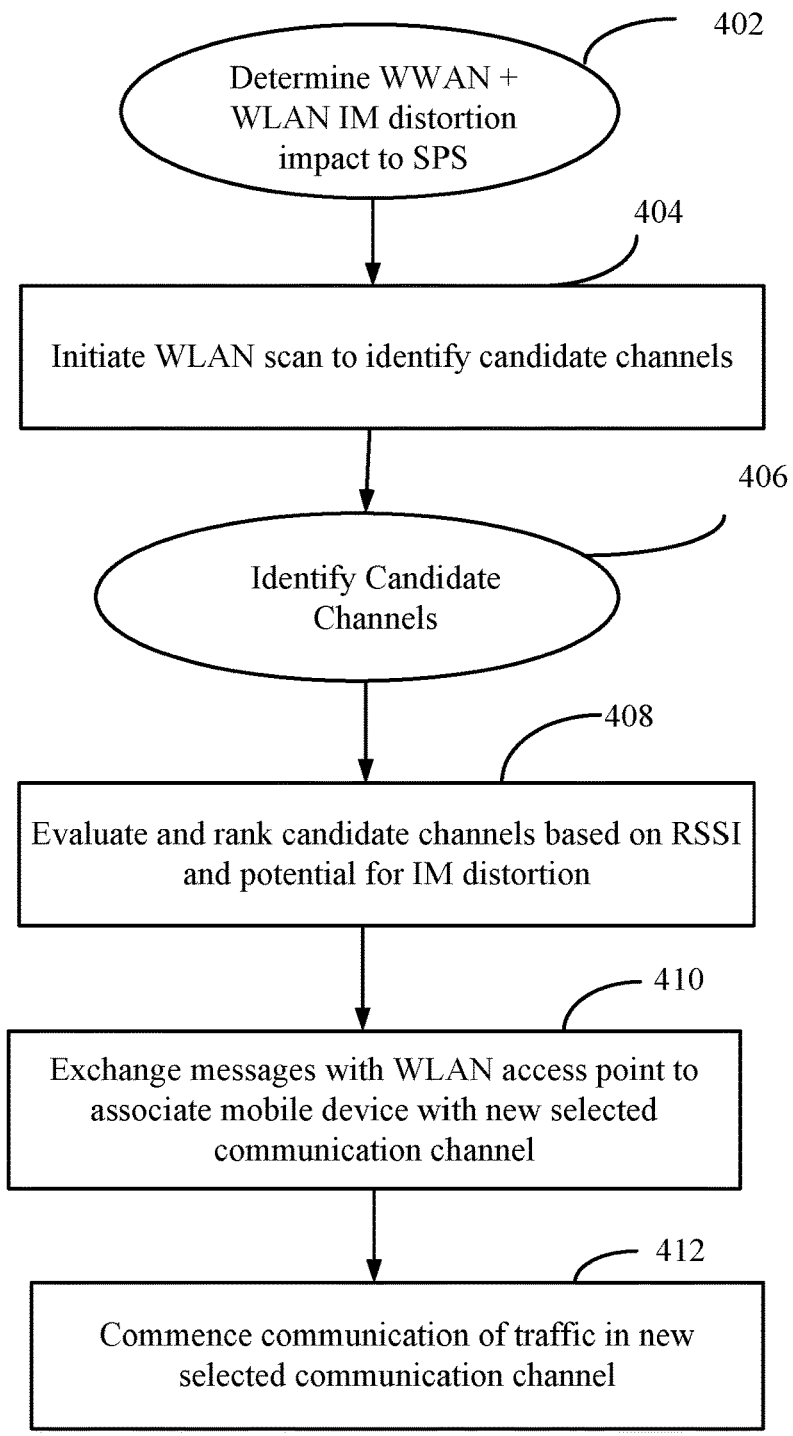
FIG. 4 is a flow diagram of a process for identifying candidate channels according to an embodiment.

FIG. 4 is a flow diagram of a process which may be executed by a mobile device in connection with block 304 according to an embodiment. According to an embodiment, particular frequency bands of communication channels in a WLAN available for selection by a mobile device may be determined or controlled by an external WLAN access point. Here, the mobile device may then establish a communication connection to the WLAN access point in a selected communication channel. As pointed out above, transmission of outgoing message traffic in a WLAN communication channel concurrently with transmission of outgoing message traffic in a WWAN communication channel may introduce intermodulation distortion impacting an RF receiving function such as SPS signal processing. If the mobile device is to be transmitting outgoing traffic in a WWAN communication channel concurrently, with transmission of outgoing traffic in the WLAN communication channel determined or controlled by the WLAN access point, the mobile device may, at event 402, determine impacts of intermodulation distortion on processing of SPS signals.

If such impacts detected at event 402 are determined to significantly degrade SPS performance, at block 404 a mobile device may initiate a WiFi scan (e.g., passive scan or active scan) to identify candidate communication channels that may be used in lieu of the previously selected WLAN communication channel. In an implementation, as discussed above, an active WiFi scan may be initiated by transmission of probe messages by a mobile device in anticipation of probe response messages from access points indicating communication channels available for establishing a communication link. Following identification of candidate channels 406 in the course of a WLAN scan initiated at block 404, block 408 may evaluate and rank the identified candidate communication channels using multiple criteria including, for example, expected intermodulation distortion impacting one or more RF receiving functions such as SPS signal processing and measured received signal strength (e.g., RSSI of each candidate channel measured at the mobile device during aforementioned WLAN scan). Expected intermodulation distortion may be determined, for example, from a look up table or computations as discussed above.

Based, at least in part, on an evaluation of candidate communication channels at block 408, a particular WLAN communication channel may be selected for establishing a connection to transmit outgoing traffic. A mobile device at block 410 may exchange message with a WLAN access point to establish a communication connection on the selected WLAN channel. For example, the mobile device may transmit an acknowledgement message on the selected communication channel to establish the connection. The mobile device may then commence transmitting outgoing messages in the selected communication channel.

Figure 5:
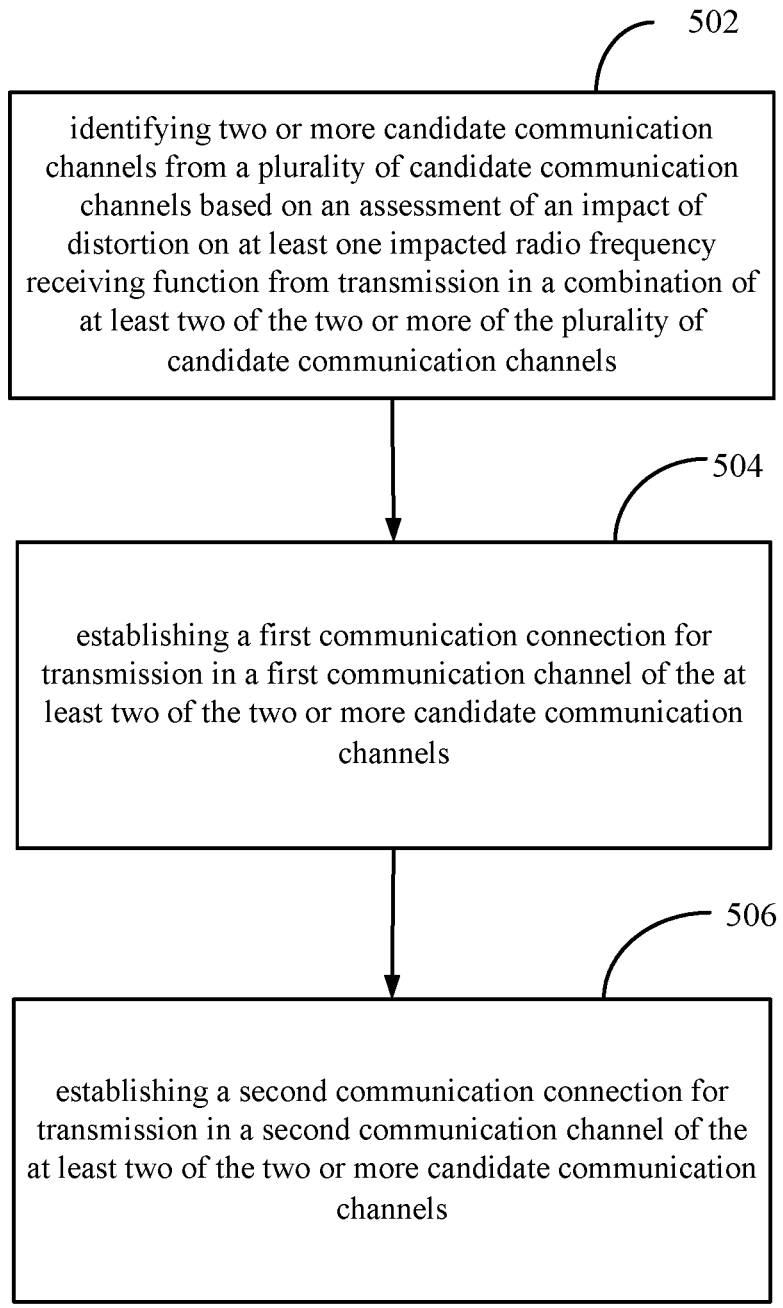
FIG. 5 is a flow diagram of a process according to an alternative embodiment.

FIG. 5 is a flow diagram of a process of establishing communication connections for transmission of outgoing messages according to an alternative embodiment. Here, a mobile device may select multiple communication channels for use in transmission of outgoing traffic. Here, block 502 may identify a plurality of candidate communication channels including, for example, one or more WLAN communication channels and/or one or more WWAN communication channels. A particular combination of candidate communication channels may be selected for establishing connections for transmission of outgoing traffic based, at least in part, on an assessment of an impact intermodulation distortion on an RF receiving function.

In an implementation, block 502 may evaluate different combinations of candidate communication channels to determine expected intermodulation distortion potentially impacting an RF receiving function. Such expected intermodulation distortion may be evaluated, for example, using look up tables or computations as discussed above. Block 502 may then select two or more of the candidate communication channels for establishing communication connections for the transmission of outgoing messages. The two or more of the plurality of candidate communication channels may be selected based on criteria such as, for example, channel conditions (e.g., measured received signal strength) and potential intermodulation distortion impacting the RF receiving function. Blocks 504 and 506 may then establish connections for the transmission of outgoing traffic on first and second communication channels of the two or more selected candidate communication channels.

Figure 6:
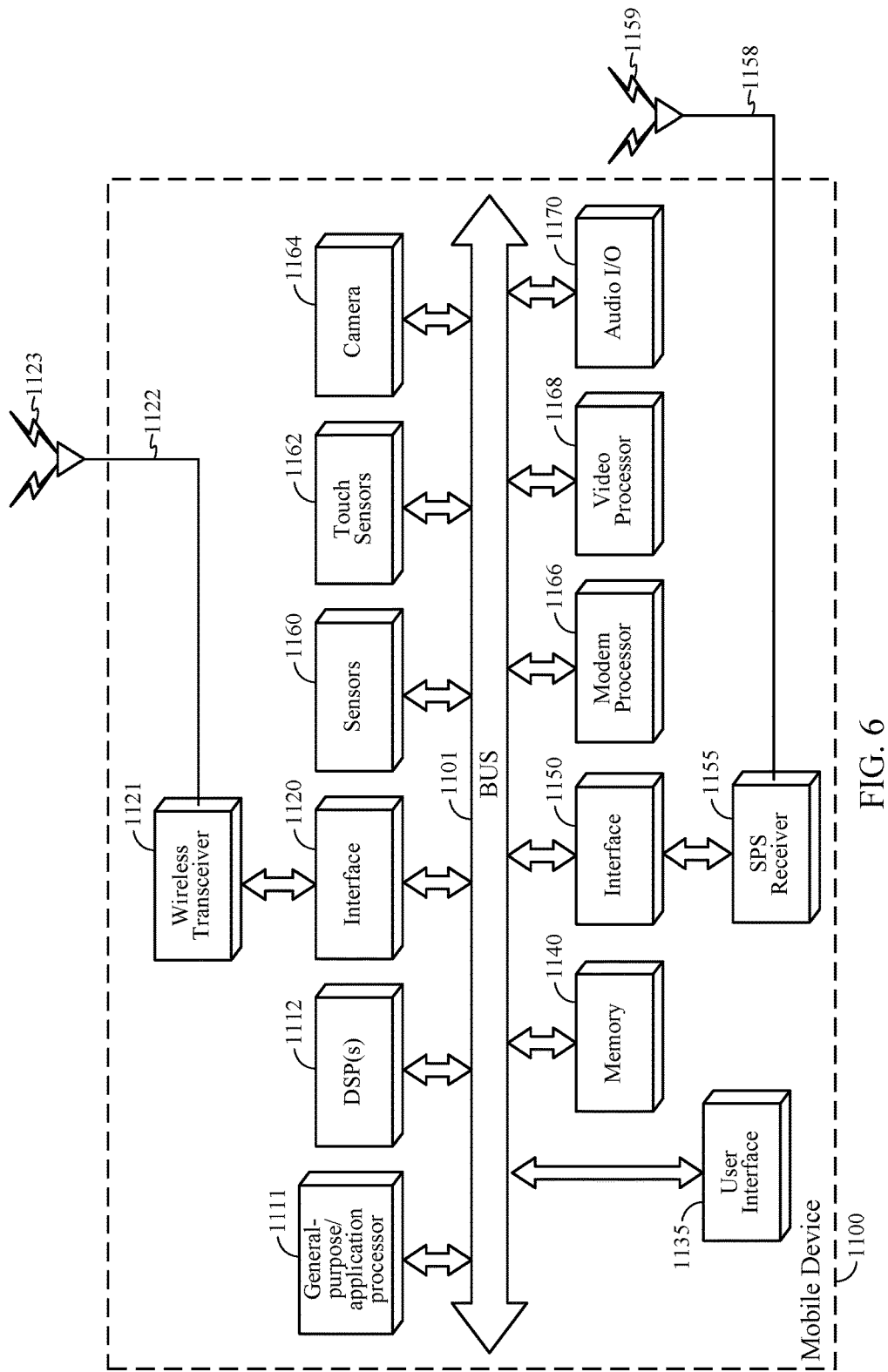
FIG. 6 is a schematic block diagram of an example computing system in accordance with an implementation.
Figure 7:
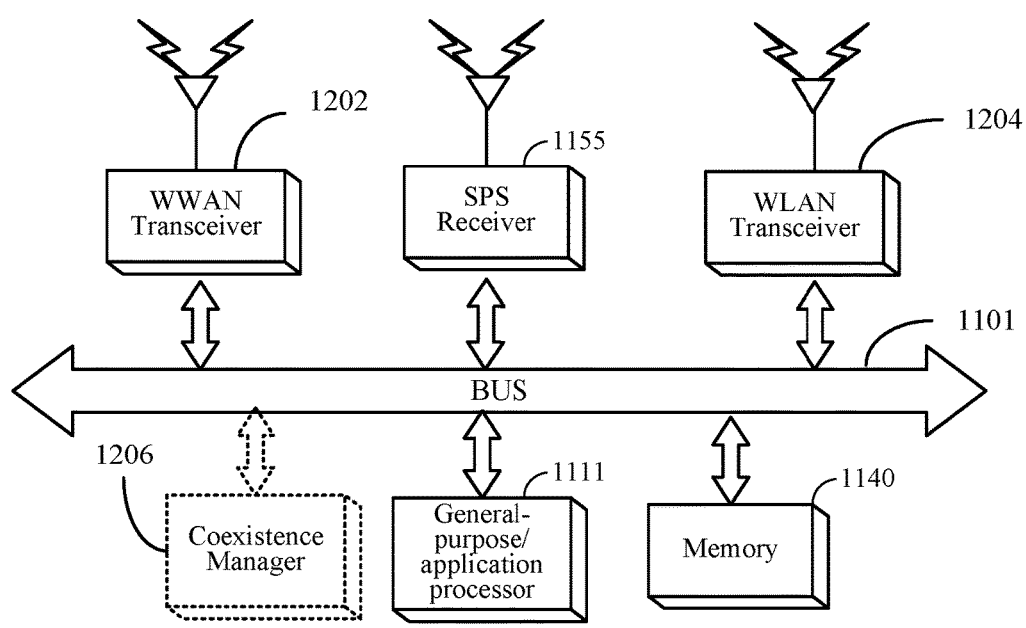
FIG. 7 is a schematic diagram of an example computing system according to an alternative implementation.

Subject matter shown in FIGS. 6 and 7 may comprise features, for example, of a computing device, in an embodiment. It is further noted that the term computing device, in general, refers at least to one or more processors and a memory connected by a communication bus. Likewise, in the context of the present disclosure at least, this is understood to refer to sufficient structure within the meaning of 35 USC § 112(f) so that it is specifically intended that 35 USC § 112(f) not be implicated by use of the term "computing device," "wireless station," "wireless transceiver device" and/or similar terms; however, if it is determined, for some reason not immediately apparent, that the foregoing understanding cannot stand and that 35 USC § 112(f) therefore, necessarily is implicated by the use of the term "computing device," "wireless station," "wireless transceiver device" and/or similar terms, then, it is intended, pursuant to that statutory section, that corresponding structure, material and/or acts for performing one or more functions be understood and be interpreted to be described at least in FIGS. 3, 4 and 5, and corresponding text of the present disclosure.

FIG. 6 is a schematic diagram of a mobile device according to an embodiment. Mobile device 105 (FIG. 1) may comprise one or more features of mobile device 1100 shown in FIG. 6. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 6, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions to execute one or more aspects of processes discussed above in connection with FIGS. 3, 4 and 5.

Also shown in FIG. 6, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121. Similarly, dedicated modem processor 1166 may perform baseband processing of signals to be upconverted for transmission by wireless transceiver 1121. In an example implementation, modem processor 1166 may have one or more features of modem 600 discussed above. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

FIG. 7 is a schematic diagram of an alternative features of mobile device 1100 according to a particular implementation. Here, wireless transceiver 1121 may comprise multiple wireless transceiver devices for multiple different RATs including WWAN transceiver 1202 and WLAN transceiver 1204. Here, selection of a second communication channel at block 304 may occur under the control of computer-readable instructions (e.g., stored on memory 1140) executing on general purpose/application processor 1111. Alternatively, selection of a second communication channel at block 304 may occur at a coexistence manager device 1206 operating as a low power controller. According to an embodiment, general purpose/application processor 1111 or coexistence manager device 1206 may determine available communication channels based on control messages received from WWAN transceiver 1202 and WLAN transceiver 1204. For example, WWAN transceiver 1202 and WLAN transceiver 1204 may forward messages on bus 1101 to coexistence manager device 1206 or general purpose/application processor 1111 indicating communication channels available in a WWAN and a WLAN. Coexistence manager device 1206 or general purpose/application processor 1111 may then provide control messages on bus 1101 to WWAN transceiver 1202 and WLAN transceiver 1204 indicating selected communication channels for establishing or maintaining a connection, for example. In an alternative implementation, control messages from coexistence manager device 1206 or general purpose/application processor 1111 to WWAN transceiver 1202 and WLAN transceiver 1204 may provide lists of available communication channels available for selection at WWAN transceiver 1202 and WLAN transceiver 1204 for establishing or maintaining a communication connection.

Particular embodiments, as described above, are directed to a method, at a mobile device, comprising: identifying two or more candidate communication channels from a plurality of candidate communication channels based on an assessment of an impact of distortion on at least one impacted radio frequency receiving function from transmission in a combination of at least two of the two or more of the plurality of candidate communication channels; establishing a first communication connection for transmission in a first communication channel of the at least two of the two or more candidate communication channels; and establishing a second communication connection for transmission in a second communication channel of the at least two of the two or more candidate communication channels. In one particular implementation, the method may further comprise transmitting outgoing message traffic concurrently in the first and second communication connections. In another particular implementation, the first and second communication channels may comprise communication channels defined according to LTE. In another particular implementation, the first communication channel comprises a communication channel defined according to LTE and second communication channel defined according to a WLAN protocol. In another particular implementation, the first and second communication channels may comprise communication channels defined according to one or more WLAN protocols.

Particular embodiments, as described above, are also directed to a mobile device, comprising: a wireless transceiver; and one or more processors configured to: identify two or more candidate communication channels from a plurality of candidate communication channels based on an assessment of an impact of distortion on at least one impacted radio frequency receiving function from transmission in a combination of at least two of the two or more of the plurality of candidate communication channels; establish a first communication connection using the wireless transceiver for transmission in a first communication channel of the at least two of the two or more candidate communication channels; and establish a second connection using the wireless transceiver for transmission in a second communication channel of the at least two of the two or more candidate communication channels. In one particular implementation, the mobile device may further comprise a satellite positioning system (SPS) receiver, and the at least one radio frequency receiving function further comprises processing SPS signals received at the SPS receiver.

Particular embodiments, as described above, are also directed to a storage medium comprising computer readable instructions stored thereon which are executable by a processor of a mobile device to: identify two or more candidate communication channels from a plurality of candidate communication channels based on an assessment of an impact of distortion on at least one impacted radio frequency receiving function from transmission in a combination of at least two of the two or more of the plurality of candidate communication channels; establish a first communication connection for transmission in a first communication channel of the at least two of the two or more candidate communication channels; and establish a second communication connection for transmission in a second communication channel of the at least two of the two or more candidate communication channels.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital sig-nal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, bytes, values, elements, symbols, characters, terms, numbers, numerals, expressions, messages, fields, identifiers frames, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons.

The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples. References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn. While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

The claims are as follows:

1. A method at a mobile device, comprising: establishing a cellular communication connection in a first communication channel; receiving WLAN signals in response to a WLAN scan, wherein the received WLAN signals indicate a plurality of available candidate WLAN communication channels, from one or more WLAN access devices; ranking the available candidate WLAN communication channels based, at least in part, on received signal strengths of the WLAN signals and an assessment of an expected impact of distortion on a GNSS receiver at the mobile device from a combination of transmission on the first communication channel and each of the available candidate WLAN communication channels, such that for two otherwise-identical ones of the available candidate WLAN communication channels, the one with higher received signal strength will be ranked higher; selecting, in response to an activation of the GNSS receiver at the mobile device, a WLAN communication channel from the plurality of available candidate WLAN communication channels for establishing a WLAN communication connection based, at least in part, on the ranking of the available candidate WLAN communication channels; and transmitting, via the WLAN communication channel, one or more messages to a selected WLAN access device of the one or more WLAN access devices to establish the WLAN communication connection in the WLAN communication channel.

2. The method of claim 1, and wherein the distortion comprises intermodulation distortion.

3. The method of claim 1, wherein the activation of the GNSS receiver occurs in response to an emergency event.

4. The method of claim 1, and further comprising transitioning the WLAN communication connection from a third communication channel to the WLAN communication channel.

5. The method of claim 1, wherein the selecting comprises selecting the WLAN communication channel corresponding to the WLAN communication channel, from among the available candidate WLAN communication channels whose impact of distortion on the GNSS receiver is not significant, with a highest received signal strength.

6. A mobile device, comprising: a wireless cellular transceiver; a GNSS receiver; a WLAN transceiver; and one or more processors configured to: establish a cellular communication connection in a first communication channel enabled by the wireless cellular transceiver; receive WLAN signals in response to a WLAN scan, via the WLAN transceiver, from one or more WLAN access devices, wherein the received WLAN signals indicate a plurality of available candidate WLAN communication channels; determine ranks of the available candidate WLAN communication channels based, at least in part, on received signal strengths of the WLAN signals and an assessment of an expected impact of distortion on the GNSS receiver from a combination of transmission on the first communication channel and each of the available candidate WLAN communication channels, such that for two otherwise-identical ones of the available candidate WLAN communication channels, the one with higher received signal strength will be ranked higher; select, in response to a request to activate the GNSS receiver, a WLAN communication channel from the plurality of available candidate WLAN communication channels enabled by the WLAN transceiver for establishing or maintaining a WLAN communication connection based, at least in part, on the ranks of the available candidate WLAN communication channels; and initiate transmission, via the WLAN communication channel, of one or more messages through the wireless cellular transceiver to a selected WLAN access device of the one or more WLAN access devices to establish the WLAN communication connection in the WLAN communication channel.

7. The mobile device of claim 6, and wherein the distortion comprises intermodulation distortion.

8. A non-transitory storage medium comprising computer readable instructions stored thereon which are executable by a processor of a mobile device to: establish a cellular communication connection in a first communication channel; receive WLAN signals in response to a WLAN scan, wherein the received WLAN signals indicate a plurality of available candidate WLAN communication channels, from one or more WLAN access devices; determine ranks of the available candidate WLAN communication channels based, at least in part, on received signal strengths of the WLAN signals and an assessment of an expected impact of distortion on a GNSS receiver at the mobile device from a combination of transmission on the first communication channel and each of the available candidate WLAN communication channels, such that for two otherwise-identical ones of the available candidate WLAN communication channels, the one with higher received signal strength will be ranked higher; select, in response to an activation of the GNSS receiver at the mobile device, a WLAN communication channel from the plurality of available candidate WLAN communication channels for establishing or maintaining a WLAN communication connection based, at least in part, on the ranks of the available candidate WLAN communication channels; and initiate transmission, via the WLAN communication channel, of one or more messages to a selected WLAN access device of the one or more WLAN access devices to establish the WLAN communication connection in the WLAN communication channel.

9. The non-transitory storage medium of claim 8, wherein the activation of the GNSS receiver occurs in response to an emergency event.

10. A mobile device, comprising: means for establishing a cellular communication connection in a first communication channel; means for receiving WLAN signals in response to a WLAN scan, wherein the received WLAN signals indicate a plurality of available candidate WLAN communication channels, from one or more WLAN access devices; means for determining ranks of the available candidate WLAN communication channels based, at least in part, on received signal strengths of the WLAN signals and an assessment of an expected impact of distortion on a GNSS receiver at the mobile device from a combination of transmission on the first communication channel and each of the available candidate WLAN communication channels, such that for two otherwise-identical ones of the available candidate WLAN communication channels, the one with higher received signal strength will be ranked higher; means for selecting, in response to an activation of the GNSS receiver at the mobile device, a WLAN communication channel from the plurality of available candidate WLAN communication channels for establishing a WLAN communication connection based, at least in part, on the ranks of the available candidate WLAN communication channels; and means for transmitting, via the second communication channel, one or more messages to a selected WLAN access device of the one or more WLAN access devices to establish the second communication connection in the second communication channel.

* * * * *